(12) United States Patent
Stamm

(10) Patent No.: US 9,287,798 B2
(45) Date of Patent: Mar. 15, 2016

(54) HIGH POWER FACTOR PRIMARY REGULATED OFFLINE LED DRIVER

(71) Applicant: STMicroelectronics, Inc., Coppell, TX (US)

(72) Inventor: Thomas Stamm, Chicago, IL (US)

(73) Assignee: STMicroelectronics, Inc., Coppell, TX (US)

( * ) Notice: Subject to any disclaimer, the term of this patent is extended or adjusted under 35 U.S.C. 154(b) by 552 days.

(21) Appl. No.: 13/706,502

(22) Filed: Dec. 6, 2012

(65) Prior Publication Data

US 2014/0160801 A1    Jun. 12, 2014

(51) Int. Cl.
*H02M 3/335*    (2006.01)
*H02M 7/217*    (2006.01)
*H05B 33/08*    (2006.01)

(52) U.S. Cl.
CPC ........... *H02M 7/217* (2013.01); *H05B 33/0815* (2013.01); *Y02B 20/347* (2013.01)

(58) Field of Classification Search
CPC .................. H02M 2001/0022; H02M 3/33507; H02M 3/335; H02M 3/325; H02M 3/33546
USPC .......... 363/21.01, 21.12, 21.16, 21.18, 21.04, 363/21.08, 21.1, 89
See application file for complete search history.

(56) References Cited

U.S. PATENT DOCUMENTS

| | | | | |
|---|---|---|---|---|
| 5,412,556 A * | 5/1995 | Marinus | .................. | H02M 1/40 363/131 |
| 5,729,443 A | 3/1998 | Pavlin | | |
| 6,707,283 B1 * | 3/2004 | Ball | .................. | H02M 3/33507 323/284 |
| 7,388,764 B2 * | 6/2008 | Huynh | .............. | H02M 3/33523 363/21.12 |
| 7,978,485 B2 | 7/2011 | Stamm et al. | | |
| 8,305,001 B2 * | 11/2012 | Horiuchi et al. | ............... | 315/219 |
| 8,432,109 B2 * | 4/2013 | Yang et al. | ..................... | 315/307 |
| 8,477,516 B2 * | 7/2013 | Chien et al. | ................. | 363/21.16 |
| 2010/0164443 A1 * | 7/2010 | Tumminaro | ...... | H02M 3/33507 323/247 |
| 2011/0025225 A1 | 2/2011 | Horiuchi et al. | | |
| 2011/0266969 A1 * | 11/2011 | Ludorf | ................ | H02M 1/4258 315/294 |
| 2012/0056551 A1 | 3/2012 | Zhu et al. | | |
| 2012/0081039 A1 | 4/2012 | Yang et al. | | |

(Continued)

OTHER PUBLICATIONS

Shao J. and Stamm T.: "A Low Cost High Power Factor Primary Regulated Offline LED Driver," IEEE, Oct. 25, 2012, pp. 4480-4484.

(Continued)

*Primary Examiner* — Timothy J Dole
*Assistant Examiner* — Sisay G Tiku
(74) *Attorney, Agent, or Firm* — Gardere Wynne Sewell LLP

(57) ABSTRACT

A fly-back type switched current regulator includes a primary transformer winding coupled to receive a rectified DC signal derived from an AC signal. The drain of a power transistor is coupled to the primary winding, with the source of the power transistor coupled to an input of a comparison circuit and a primary transformer winding sense resistor. A control terminal of the power transistor is coupled to an output of the comparison circuit. A capacitor stores a variable reference signal for application at a first capacitor terminal to another input of the differential circuit. The variable reference signal is compared to a winding current signal generated by the sense resistor by the comparison circuit. An injection circuit applies an AC signal derived from the rectified DC signal to a second terminal of the capacitor so as to modulate the stored variable reference signal. The regulator is coupled to drive LEDs.

23 Claims, 13 Drawing Sheets

(56) References Cited

U.S. PATENT DOCUMENTS

2012/0098463 A1   4/2012   Stamm et al.
2012/0112645 A1   5/2012   Lee et al.
2012/0262961 A1   10/2012  Chien et al.
2013/0088897 A1*  4/2013   Adragna ........... H02M 3/33507
                                                    363/21.12

OTHER PUBLICATIONS

STMicroelectronics Product Sheet, "HVLED815PF—Offline LED Driver with Primary-Sensing and High Power Factor Up to 15 W," Oct. 2012, 18 pages.

NXP Product Data Sheet, "TEA152x, SMPS ICs for Low-Power Systems," Sep. 14, 2010 (20 pages).

EPO Search Report and Written Opinion for EP 13195746.6 mailed Jun. 3, 2014 (8 pages).

Shao, Jianwen, et al: "A Low Cost High Power Factor Primary Regulated Offline LED Drive," 2012 IEEE, pp. 4498-4502.

Hwang, Jong Tae, et al: "Off-the-Line Primary Side Regulation LED Lamp Driver With Single-Stage PFC and TRIAC Dimming Using LED Forward Voltage and Duty Variation Tracking Control," 2012 IEEE, pp. 3081-3094.

* cited by examiner

HIGH POWER FACTOR PRIMARY REGULATED OFFLINE LED DRIVER

TECHNICAL FIELD

The present invention relates to offline constant current driver circuits such as those used to drive light emitting diodes (LEDs) in lighting applications.

BACKGROUND

LED lighting offers many potential benefits over incandescent, halogen, fluorescent and gas/arc lamps because, at least, such lighting has a longer life time, no mercury, and a fast evolutionary improvement of efficiency. Those skilled in the art note movement throughout the world to ban or limit the use of incandescent lamps. LED lighting is viewed as being a viable replacement. However, a primary challenge to the exploitation of LED lighting, especially in low power bulbs, is the size and cost of the driver circuitry which must be included in each bulb.

The most commonly used topology for an offline LED driver is the flyback topology. On the primary side, a controller and discrete power devices are necessary for power conversion. In order to have an accurate and constant LED current, driver circuits typically utilize a secondary LED current feedback. An opto-coupler is also required to transfer the sensed signal from the secondary side past the isolation barrier to the primary side controller. For low wattage bulbs, this the secondary-side and feedback components can be a problem since there is little space available in the bulb for including the necessary circuit components.

The solution to this problem is to use primary control. Those skilled in the art understand the primary control topology regulates the LED current through the primary side. One easy way to implement primary control is to provide for constant power control in flyback. A drawback of this solution for constant power control is that the LED current may not be constant when the LED forward voltage varies. Another approach is to estimate the secondary output current feedback by sensing primary peak current and duty cycle through an analog circuit or digital circuit. For example, the LED current may be calculated by sampling the peak value of the primary current and detecting the secondary diode conduction period. There are two main concerns with this solution. First, a high speed sample and hold circuit is required to measure the peak value of the primary current. Second, there is a time delay between the sample and hold to the actual switching which introduces an error in the current measurement. In yet another approach for primary control, the primary current reference is directly used for controlling output current. Advantageously, this eliminates the need for a sample and hold circuit, and a reduction in overall size and cost of the circuit is achieved by integrating a high voltage avalanche-rugged power MOSFET with the controller circuitry. Unfortunately, this solution is available for DC voltage input only.

There is a need in the art for a cost effective power factor correction function implemented by means of a highly integrated driver device so as to minimize the number of external components and provide a compact and cost effective solution.

SUMMARY

In an embodiment, a circuit comprises: a transformer including a primary winding having a first terminal configured to receive a rectified DC signal derived from an AC signal, and having a second terminal; a differential circuit having a first input, a second input and an output; a power transistor having a first conduction terminal coupled to the second terminal of the primary winding, and having a second conduction terminal coupled to the first input of the differential circuit, and further having a control terminal coupled to the output of the differential circuit; a capacitor having a first terminal coupled to the second input of the differential circuit and having a second terminal; and an injection circuit configured to apply an AC signal derived from the rectified DC signal to the second terminal of the capacitor.

In an embodiment, a circuit comprises: a first winding coupled to receive a rectified DC signal derived from an AC signal; a current sensing resistor coupled in series with the first winding and configured to generate a first signal indicative of sensed current in the first winding; a comparison circuit configured to compare the first signal to a second signal presenting a variable reference value; a capacitor configured to store the variable reference value, the capacitor having a first terminal coupled to the comparison circuit and having a second terminal; and an injection circuit configured to apply an AC signal derived from the rectified DC signal to the second terminal of the capacitor storing the variable reference value.

In an embodiment, a method comprises: sensing current in a first winding that is coupled to receive a rectified DC signal derived from an AC signal; storing a variable reference signal on a capacitor; comparing the sensed current in the first winding to the variable reference signal; controlling the current flow in the first winding in response to the comparison; and injecting an AC signal derived from the rectified DC signal to modulate the stored variable reference signal.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
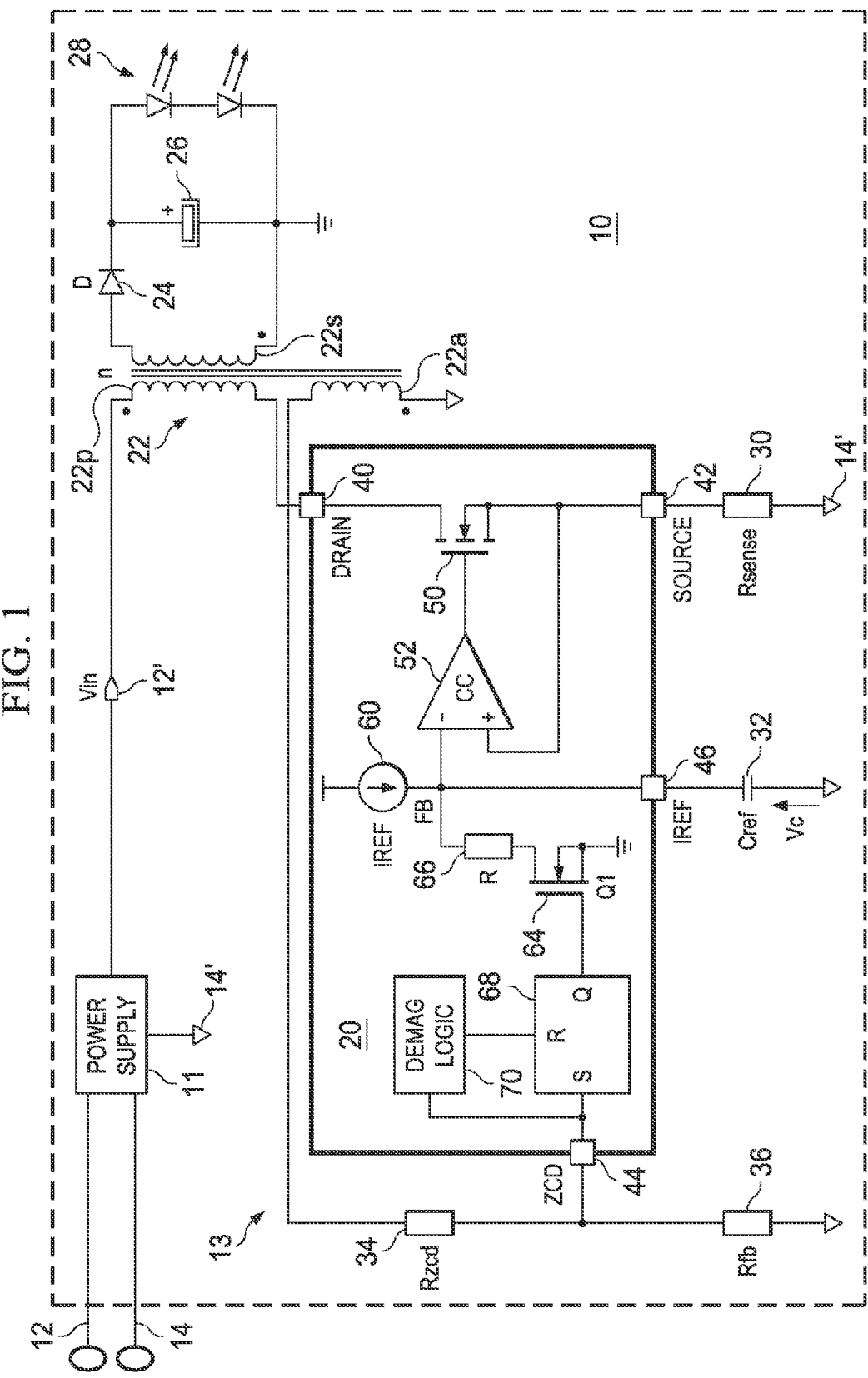
FIG. 1 illustrates an LED light with primary control circuitry.
Figure 2A:
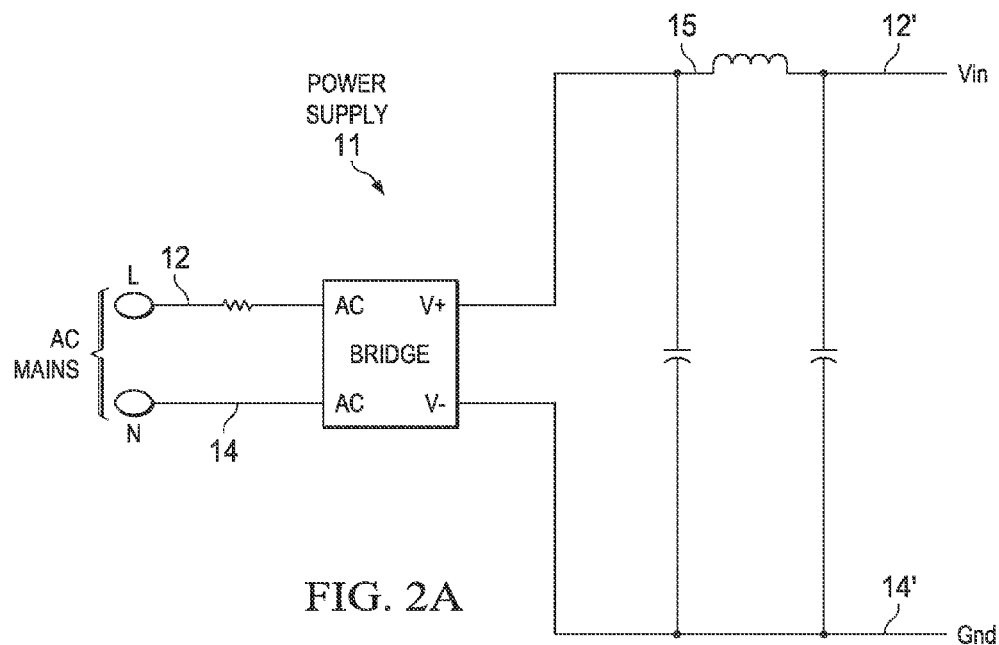
FIGS. 2A and 2B illustrate circuit diagrams for a power supply of the primary control circuitry.
Figure 2B:
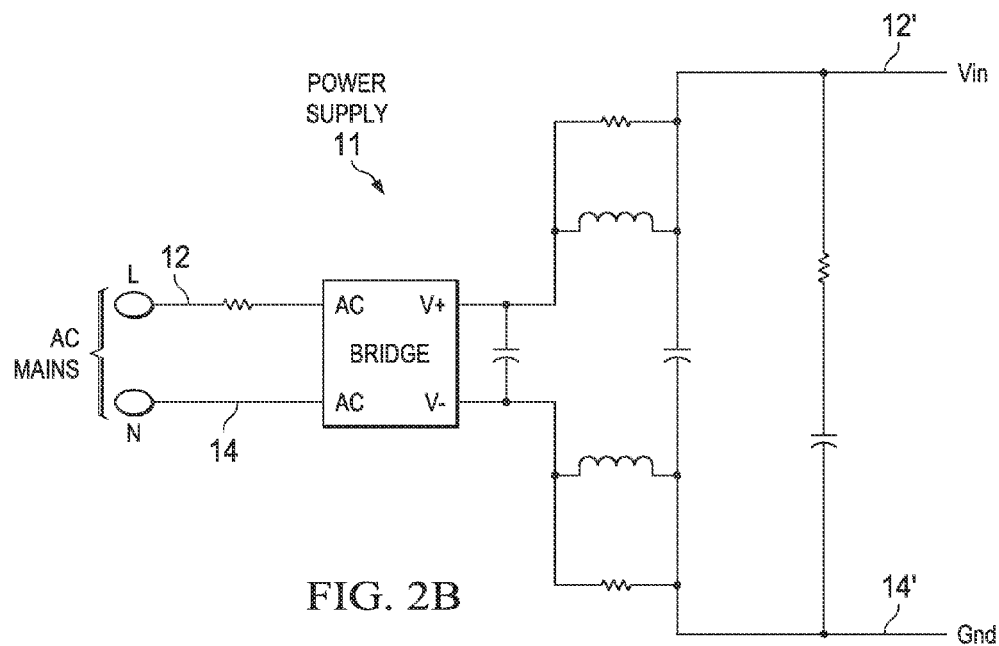

Reference is now made to FIG. 1 which illustrates an LED light 10 having input power terminals 12 and 14 and a primary control circuitry. The dotted line is representative of the extent of the light package, it being understood that the package may have any shape and configuration suitable for a desired lighting application or fixture, it further being understood that the package may take the form of a light bulb. The LED light 10 includes power terminals 12 and 14 configured for connection to a supply such as AC Mains (an example of this, in the format of a bulb type package, would comprise terminals suitable for socket connections). An internal power supply 11 for the primary control circuitry is coupled to the terminals 12 and 14 and is configured to produce a rectified DC supply input Vin (derived from the AC signal at the AC Mains) at positive supply terminal 12' and negative supply terminal 14' using a circuit of the type shown in FIGS. 2A and 2B which supports connection to the AC mains and includes a fuse, a bridge rectifier and filtering circuitry (using capacitors and inductors).

The primary control circuitry of the light 10 comprises a lighting circuit 13 connected to the power supply 11. The lighting circuit 13 comprises the following main components: a driver circuit 20, a transformer 22, a diode 24, a first capacitor 26, a plurality of LEDs 28, a first resistor 30, a second capacitor 32, a second resistor 34 and a third resistor 36. It will be understood that other components may also be present but are not illustrated.

The driver circuit 20 is of conventional primary control configuration known to those skilled in the art. The circuit 20 includes a drain terminal 40, a source terminal 42, a demagnetization sensing terminal 44 and a current reference terminal 46. The driver circuit 20 further includes power supply and ground terminals which are not explicitly shown. The driver circuit may further include additional terminals supporting the connection of external circuitry in connection with the provision of other features. The illustration of the driver circuit 20 and operational description provided herein supply information concerning basic operation of the circuit necessary for an understanding of the embodiments and features described.

The driver circuit 20 is preferably implemented as one or more integrated circuit devices. An example of such an implementation is the HVLEDxxx family of integrated circuit chips provided by STMicroelectronics. Other driver circuits of similar design and operation are known in the art.

The driver circuit 20 includes an n-channel power MOSFET 50 having a drain connected to the drain terminal 40 and a source connected to the source terminal 42. The gate of the MOSFET 50 is coupled to the output of a comparison circuit such as a comparator 52 configured as a current comparator circuit. A positive input terminal of the comparator 52 is connected to the source of the MOSFET 50 (that connection possibly including a feedback resistor—not explicitly illustrated, see FIG. 12). The negative input terminal of the comparator 52 (at node FB) is connected to receive a variable reference voltage Vc (wherein this reference voltage is also referred to as the constant current regulation loop reference voltage that is used as a reference for the power MOSFET's peak drain current during constant current regulation). The first resistor 30 is connected between the source of the MOSFET 50 and a reference supply node at negative supply terminal 14'. The combination of MOSFET 50, comparator 52 and first resistor 30 in this circuit configuration forms a regulator circuit whose operation is well known to those skilled in the art. The first resistor 30 functions as a current sensing resistor to sense the current flowing through the transformer 22 (and in particular the current flowing through a primary winding 22p).

In a preferred implementation, the integrated circuit for the power MOSFET 50 and the integrated circuit for the remaining circuitry of the driver circuit 20 are provided within a common integrated circuit package (for example, using stacked or adjacently mounted integrated circuit dies). It will be understood that other packaging configurations known in the art could be used including providing a package for the power MOSFET and a separate package for the remaining circuitry of the driver circuit 20 (this providing the power MOSFET as an off-chip component). In an alternative implementation, the remaining circuitry of the driver circuit need not be implemented as an integrated solution but rather provided as an assembled circuit using various circuit components.

A current source 60 is coupled between the positive supply node of the circuit 20 and the negative input terminal of the comparator 52. The negative input terminal of the comparator 52 is further connected to the current reference terminal 46, and the second capacitor 32 is connected between the current reference terminal 46 and the reference supply node at negative supply terminal 14'. The reference voltage Vc at the negative input terminal of the comparator 52 is stored across the second capacitor 32. The current source 60 functions to source current to charge the voltage Vc across the second capacitor.

The driver circuit 20 further includes an n-channel switching MOSFET 64 having a drain coupled to the negative input terminal of the comparator 52 through a resistor 66. In this configuration a first terminal of the resistor 66 is connected to the drain of the MOSFET 64 and a second terminal of the resistor 66 is connected to the negative input terminal of the comparator 52. The source of MOSFET 64 is connected to the negative supply node of the circuit 20.

The gate of the MOSFET 64 is coupled to the output of a flip flop 68. The "set" input of the flip flop 68 is connected to the demagnetization sensing terminal 44. The "reset" input of the flip flop 68 is connected to the output of a demagnetization logic circuit 70. An input of the demagnetization logic circuit 70 is connected to the demagnetization sensing terminal 44.

In response to a logic high output from the flip flop 68, the MOSFET 64 is turned on and current is drained from the negative input terminal of the comparator 52. This causes a reduction in the variable reference voltage Vc stored across the second capacitor 32 and applied at the negative input terminal of the comparator 52. Conversely, in response to a logic low output from the flip flop 68, the MOSFET 64 is turned off and the current source 60 sources current to the negative input terminal of the comparator 52. This causes an increase in the variable reference voltage Vc stored across the second capacitor 32 and applied at the negative input terminal of the comparator 52.

The transformer 22 includes the primary winding 22p with a first terminal connected to the reference supply node at positive supply terminal 12' and a second terminal connected to the drain terminal 40 of the driver circuit 20. The transformer 22 further has a secondary winding 22s with a first terminal connected to the anode of the diode 24. The plurality of LEDs 28 are connected in series with each other with the anode of the first LED in the series coupled to the cathode of the diode 24 and the cathode of the last LED in the series coupled to the second terminal of the secondary winding 22s. The capacitor 26 is coupled in parallel with the plurality of LEDs 28 such that a first terminal of the capacitor 26 is coupled to the anode of the first LED in the series and the second terminal of the capacitor is coupled to the cathode of the last LED in the series. The transformer further has an auxiliary winding 22a with a first terminal connected to the reference supply node at negative supply terminal 14' and a second terminal coupled to the demagnetization sensing terminal 44 through the second resistor 34. In this configuration, a first terminal of the second resistor 34 is connected to the second terminal of the auxiliary winding 22a and a second terminal of the resistor is connected to the demagnetization sensing terminal 44. The third resistor 36 is connected between the demagnetization sensing terminal 44 and the reference supply node at the negative supply terminal 14'. The windings 22p, 22s and 22a share a common core and thus are magnetically coupled to each other.

The auxiliary winding 22a functions as a sensing circuit operable to sense the conduction angle of the diode 24. The sensed signal generated by the auxiliary winding 22a is applied to the demagnetization sensing terminal 44 and used by the flip flop 68 and demagnetization logic circuit 70 to generate the control signal which is applied to control the operation of the switching MOSFET 64. The resistor 66 in series with MOSFET 64 controls a current Vc/R that is sunk from the negative input terminal of the comparator 52 when MOSFET 64 is turned on, where Vc is the voltage developed across the capacitor 32 (having a capacitance Cref).

When power MOSFET 50 is turned off, the diode 24 on the secondary side of transformer 22 will conduct current. The signal ZCD at the demagnetization sensing terminal 44 will be high. The flip flop 68 responds to this high signal at the "set" input by generating a logic high output signal for application to the gate of the MOSFET 64. In response thereto, the MOSFET 64 is turned on to permit sinking of the current Vc/R and discharge of the capacitor 32. The demagnetization logic circuit 70 then resets the flip flop 68 and for the rest of the period the MOSFET 64 is turned off. The sinking current is removed and the capacitor 32 will be charged with current IREF by the current source 60. In steady state, the reference voltage on capacitor 32 will hold constant (provided a sufficiently large capacitance is available).

The average output current Iout on the secondary side can be expressed as:

$$Iout = \frac{Is}{2} * \frac{Tonsec}{T} \qquad \text{Equation 1}$$

Where Is is the peak of secondary current, Tonsec is the secondary conduction time, T is the period of the switching cycle. If the turns ratio of the flyback transformer is n, then:

$$Is = n*Ip \qquad \text{Equation 2}$$

Where Ip is the peak of primary current. In steady-state, according to charge balance of Cref, then:

$$Iref*(T - Tonsec) + \left(Iref - \frac{Vc}{R}\right)*Tonsec = 0 \qquad \text{Equation 3}$$

Where Vc is the voltage of Cref. From Equation 3, then:

$$Vc = R*Iref*\frac{T}{Tonsec} \qquad \text{Equation 4}$$

If Vc is used as the reference for the current comparator, the peak primary current can be expressed as:

$$Ip = \frac{Vc}{Rsense} \qquad \text{Equation 5}$$

From Equations 1, 2 and 5, the following may be derived:

$$Iout = \frac{n}{2}*\frac{R*Iref}{Rsense} \qquad \text{Equation 6}$$

Figure 3:
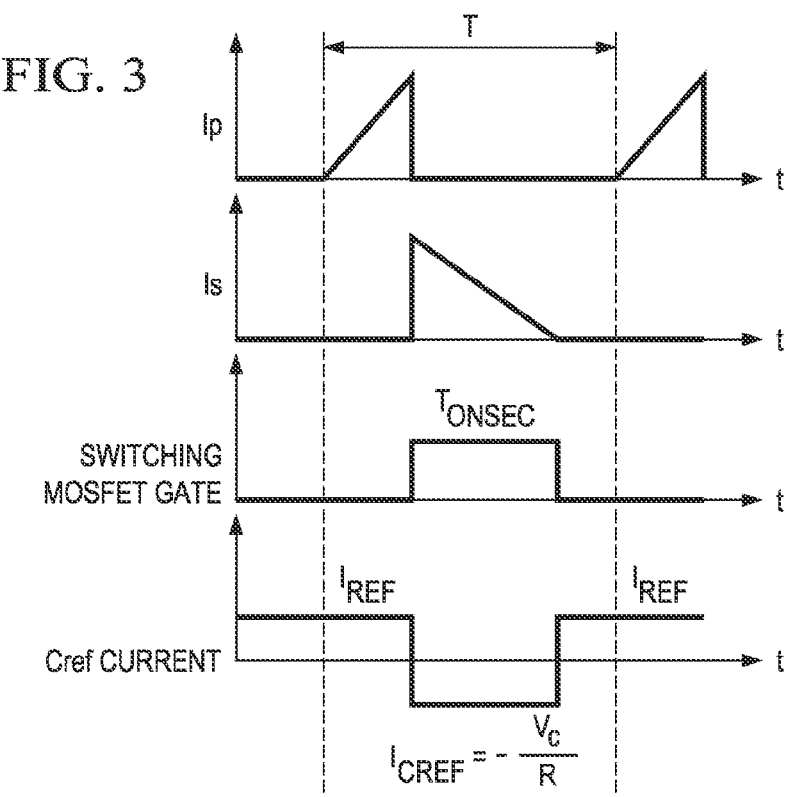
FIG. 3 shows timing for switching period of the primary control circuitry of FIG. 1.

FIG. 3 shows the timing for the switching period of the circuitry shown in FIG. 1.

Equation 6 shows that the average output current no longer depends on the input or the output voltage, and does not depend on transformer inductance values. The external parameters defining the output current are the turns ratio n of the transformer 22 and the resistance of the current sense resistor 30, both of which can be well controlled. The internal parameter R*Iref of the driver circuit 20 can be guaranteed by the design process.

The driver circuit 20 functions to regulate output current in the DC input flyback supply by calculating the peak current at which to shut off the power MOSFET 50 by continuously sensing the duty cycle. The error between a desired duty cycle and the sensed actual duty cycle appears as a current on the current reference terminal 46 (where the capacitor 32 functions to integrate the error to zero over time). Since the voltage on the current reference terminal 46, divided by two, directly sets the current at which the power MOSFET 50 turns off, the output current is regulated.

A very small capacitor is all that is needed on the current reference terminal 46 in the DC-input flyback power supply for a quick response to changing load voltage or input voltage. In the LED driver application, however, the capacitance Cref can be much larger, and this results in a regulation of the LED current more slowly, because averaging out of the error out can be done over several cycles of the input voltage. For example, a capacitance on the order of 4.7 uF is commonly used.

Figure 4:
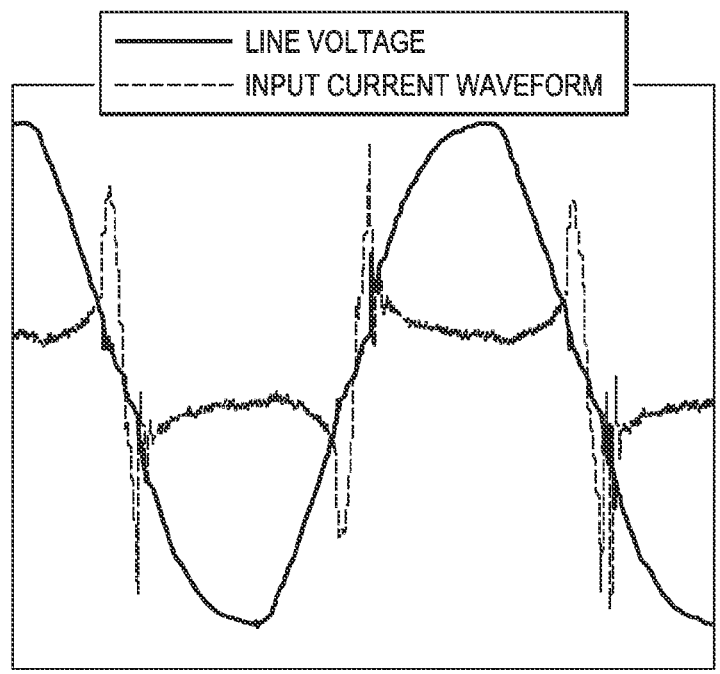
FIG. 4 illustrates an input current waveform.

The circuitry functions to keep average LED current constant even if the input voltage waveform is grossly distorted. Such a distortion may occur, for example, if Vin is a rectified sinewave, as is common in use of the power factor corrected circuits. The input current waveform is shown by example in FIG. 4. The peak MOSFET shutoff current remains at the same level throughout the AC half cycle, but the duty cycle of the converter changes. It will be noted that MOSFET ON time increases at lower input voltage because it takes longer to reach the same current if the converter input voltage is lower. The resulting input current waveform is rich in harmonics (THD is in the range of 130%) making it unacceptable for commercial use.

The primary regulation performed in the circuitry of the light 10 is for DC input. Thus, the LED current reference is DC on the current reference terminal 46. This can cause a significant distortion in the AC current waveform at the line zero crossing. In order to solve this issue, a DC offset may be introduced in the current sensing signal path using a DC offset circuit coupled to the source terminal 42. However, this offset disturbs the calculation that sets the LED current. Additionally, because the line voltage is injected into the current sensing pin to shape the current waveform, the input voltage variation causes significant variation in the LED current. To address this issue, a line voltage feed forward compensation circuit may be coupled to the source terminal 42. The DC offset circuit and the line voltage feed forward compensation circuit can be quite complicated and will each add a significant number of off-chip circuit components (resistors, capacitors, etc.) to the light 10. This is undesirable, especially with respect to the limited space implementations associated with low wattage lighting packages.

Figure 5:
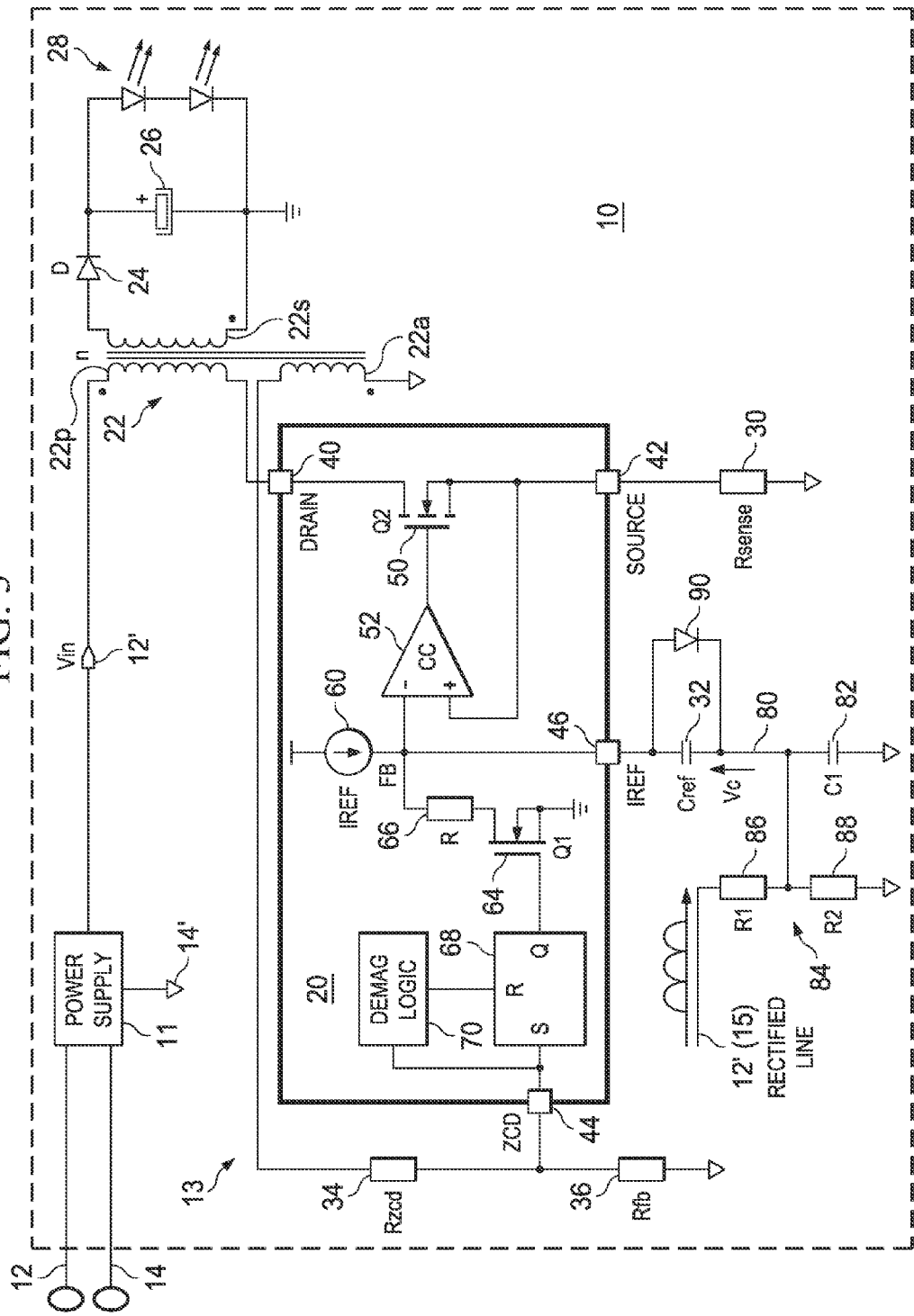
FIG. 5 illustrates an LED light with primary control circuitry and power factor correction.

Reference is now made to FIG. 5 which illustrates an LED light 10' with primary control circuitry and power factor correction. The light 10' of FIG. 5 is substantially the same as the LED light 10 of FIG. 1. Like reference numbers refer to like or similar parts. The description of such like or similar parts shown in FIG. 1 is incorporated herein by reference. No further description of such parts will be provided. Instead, the following description will focus on structural and functional differences.

Figure 10:
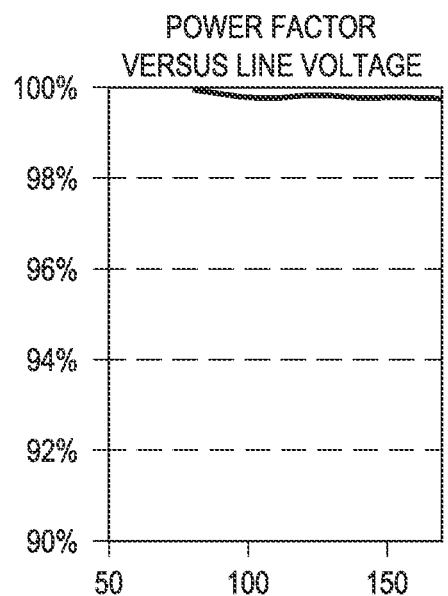
FIG. 10 is a graph of power factor versus line voltage.

The primary control circuit for the light 10' of FIG. 5 differs from that used in FIG. 10 in terms of the use of off-chip current injection circuitry coupled to the current reference terminal 46. The capacitor 32 is connected between the current reference terminal 46 and an intermediate node 80. An additional capacitor 82 is connected between the intermediate node 80 and the negative supply terminal 14'. A voltage divider circuit 84 is coupled between the positive supply terminal 12' and the negative supply terminal 14' with the intermediate node 80 forming the tap node of the divider. Thus, a first divider resistor 86 is connected between the positive supply terminal 12' and the intermediate node 80, and a second divider resistor 88 is connected between the intermediate node 80 and the negative supply terminal 14'. The additional capacitor 82 functions as a filter to keep switching noise from appearing at the current reference terminal 46. A diode 90 may be connected in parallel with the capacitor 32 (especially useful with dimmable light applications), with the anode of diode 90 connected to the current reference terminal 46 and the cathode of diode 90 connected to the intermediate node 80. The diode 90 functions as a voltage clamp in support of a dimming operation because in the absence of diode 90 the capacitor 32 may be charged to a high voltage which causes high current distortion at low (for example, less than 20%) conduction angles.

In an alternative embodiment, the voltage divider circuit 84 is coupled between the rectified signal output node 15 (see, FIG. 2A) and the negative supply terminal 14' with the intermediate node 80 forming the tap node of the divider. What is important is that a connection be made to receive a rectified DC signal derived from the AC Mains signal.

As the positive supply terminal 12' is configured to receive the rectified DC supply at the input Vin, the voltage divider circuit 84 functions in a current injection mode to supply a small AC signal to the intermediate node 80. The rectified signal at node 80 contains a DC component. Over several cycles the capacitance Cref (capacitor 32) charges in a direction to remove the DC component from the divider R1-R2, leaving only the correct controlling waveform on the current reference terminal 46. The average voltage (DC component) at the current reference terminal 46 is the same as for the DC input case. So, over several cycles, Cref removes the injected DC component, leaving only the injected AC component. The small AC signal that is injected into node 80 will cause an additional variation of the variable reference voltage Vc (i.e., the variable reference voltage Vc is modulated by the small AC signal at the FB input node of the comparator 52). The purpose of this signal injection is to shape the peak current at which the power MOSFET 50 turns off. The fraction of the rectified DC supply at the input Vin injected into the bottom of the capacitor 32 at intermediate node 80 will cause the peak current envelope of the MOSFET 50 to take on a shape like the shape of the injected rectified line voltage. For a certain injected voltage level, and within a narrow range around that voltage level, the peak current for power MOSFET 50 will just reach zero at zero crossings of the AC Mains signal, and the filtered line current will resemble the line voltage thus giving rise to power factor correction.

By rewriting Equation 4 in terms of input and output voltage, the average voltage of Vc is:

$$Vc_{AVE} = R * Iref * \left(1 + \frac{n * Vout}{Vin_{AVE}}\right) \quad \text{Equation 7}$$

Where $Vin_{AVE}$ is the average value of rectified input voltage.

Furthermore, with respect to the voltage divider circuit:

$$VR2_{AVE} = Vin_{AVE} * \frac{R2}{R1 + R2} \quad \text{Equation 8}$$

Where R1 and R2 are the resistances of the first divider resistor 86 and second divider resistor 88, respectively.

Figure 6:
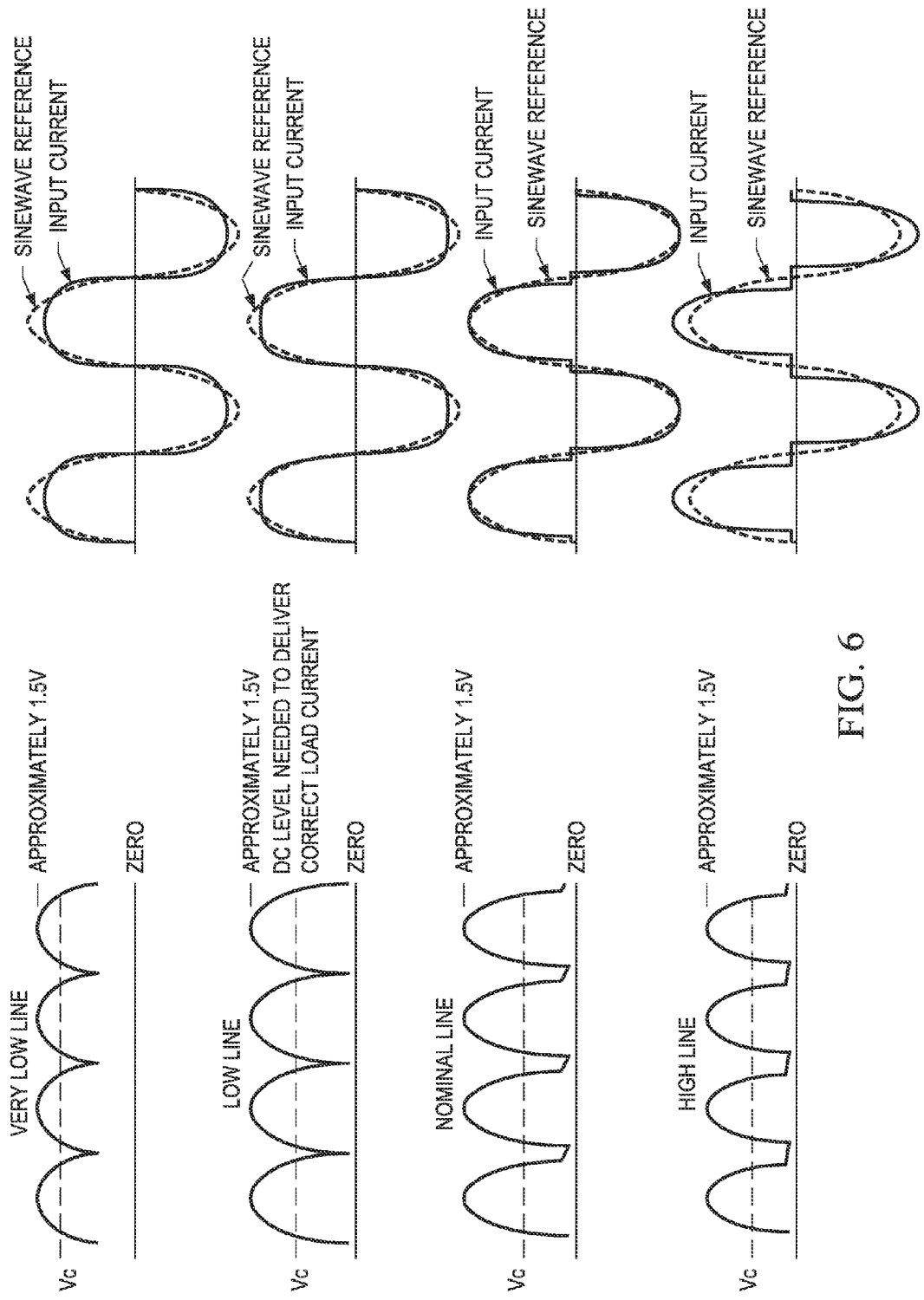
FIGS. 6-8 illustrate operational waveforms for the LED light of FIG. 5.

If R1 and R2 are selected at nominal input such that Equation 8 equals Equation 7 (i.e., setting the average value of Vi*R1/(R1+R2) equal to the set point of the current reference terminal 46), then the rectified AC signal will appear at Cref (capacitor 32) because the DC component generated from the internal current source is exactly same as that injected from the line voltage. At this condition (referred to as nominal line), the line waveform appears at the current reference terminal 46 and the input current for the light 10' substantially matches the sinewave of the AC Mains as shown in FIG. 6. The current waveform at nominal line condition has the lowest harmonic content due to the input current distortion inherent in PFC flyback converter operation. The change in the input current waveform is valid at the line voltage selected for the nominal line condition, and FIG. 6 further illustrates operation above and below the nominal line condition.

Figure 7:
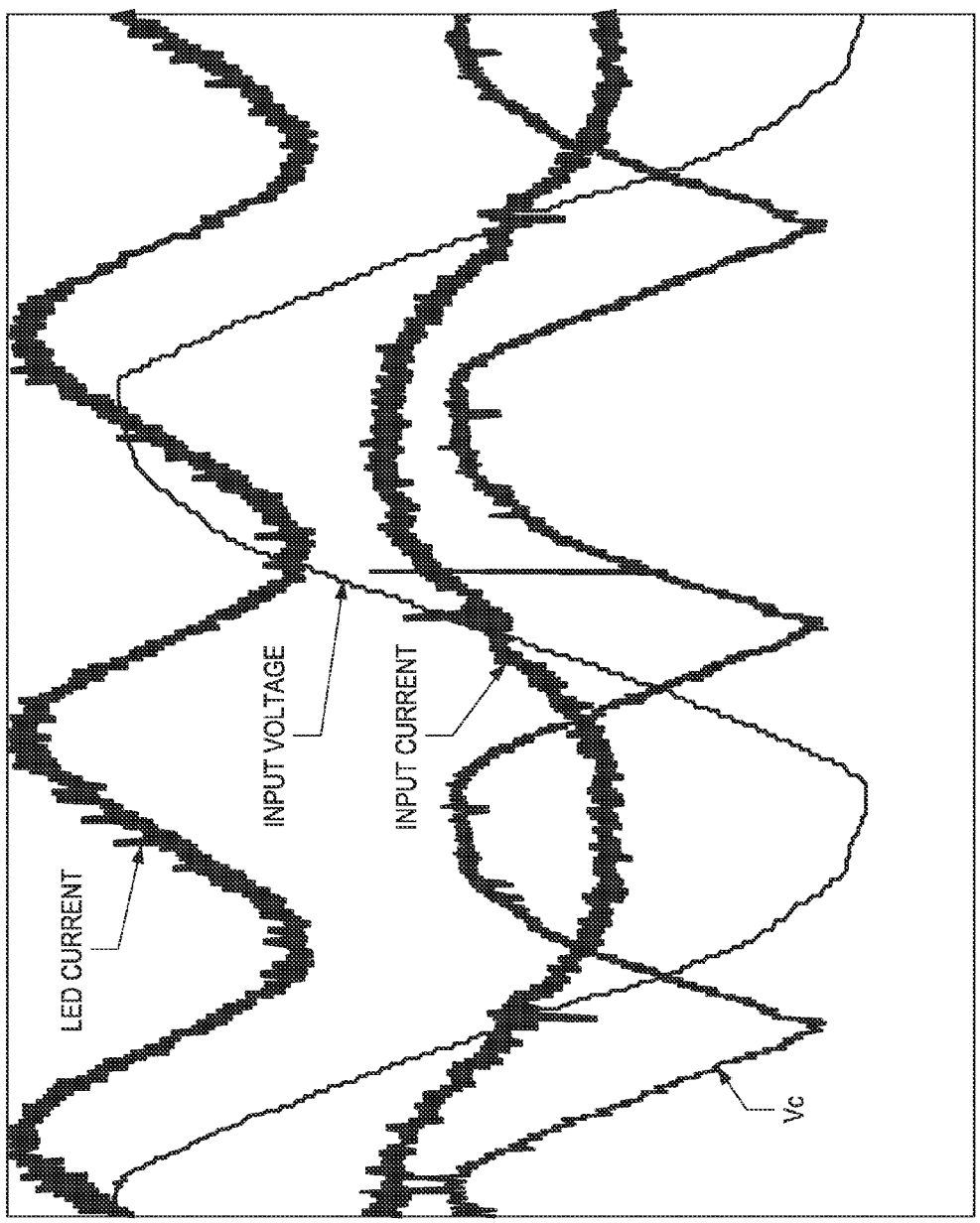
Figure 8:
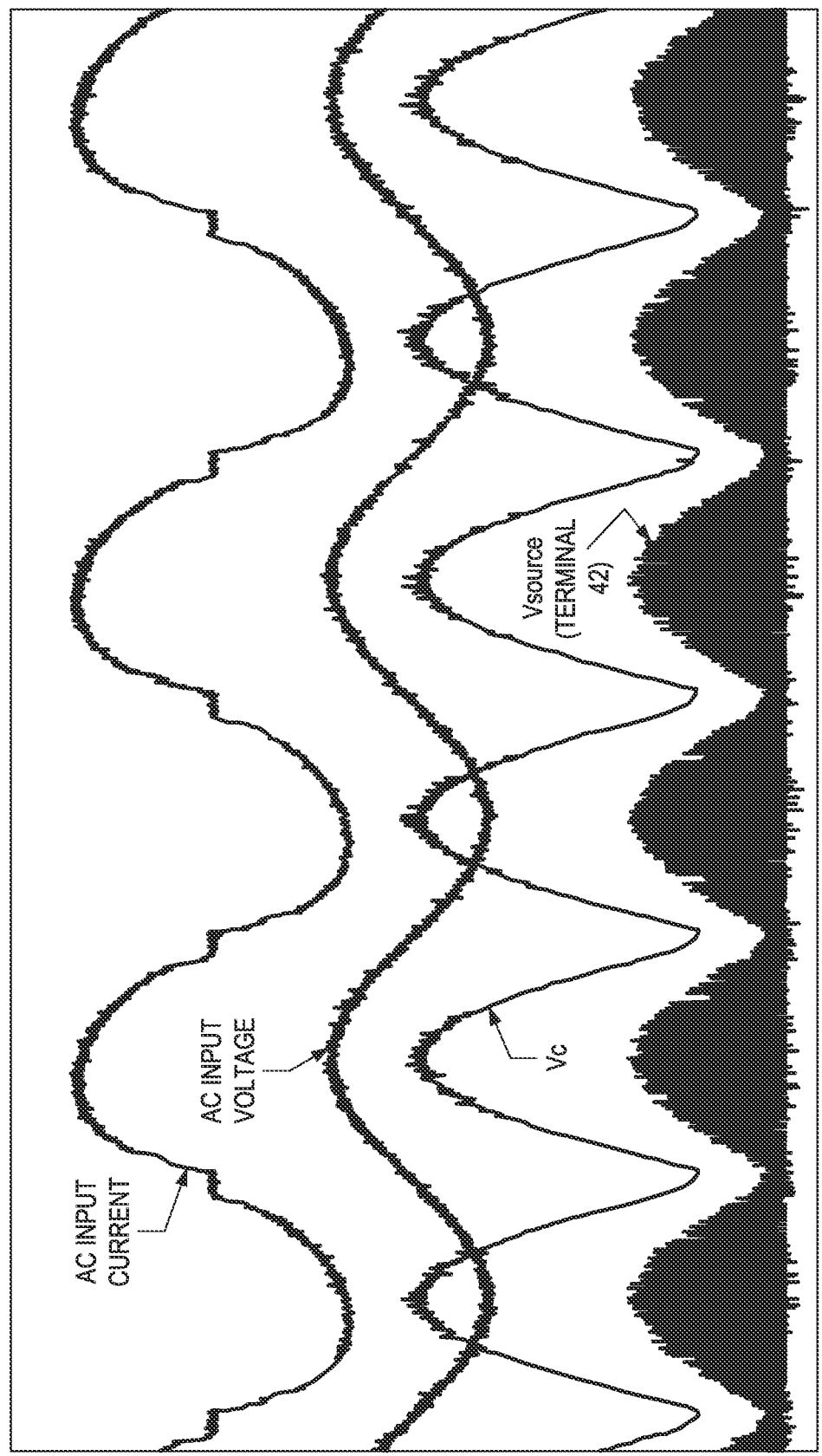

At the certain line voltage associated with the nominal line condition, the peak current of the power MOSFET 50 will track the line voltage. This is illustrated in FIGS. 7 and 8. Above and below this voltage, the current waveform for the power MOSFET 50 will be slightly distorted, but the regulator functionality of the driver circuit 20 will regulate the average output current by introducing a small DC offset. The input current distortion is accordingly small within an offset range of the line voltage.

In this way, both current regulation and power factor correction are achieved.

Figure 9A:
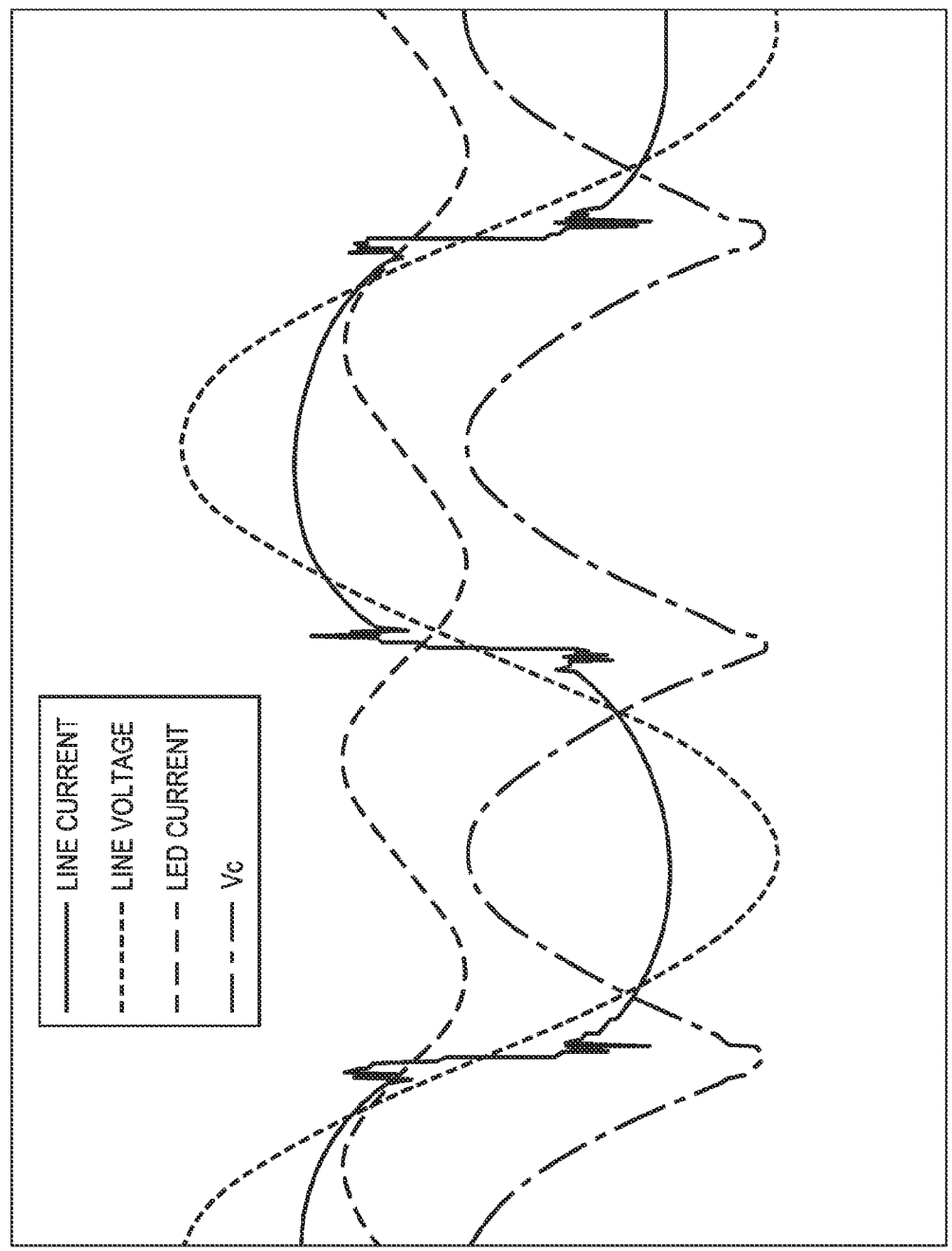
FIGS. 9A-9C illustrate operational waveforms over a range of AC Mains voltage levels.
Figure 9B:
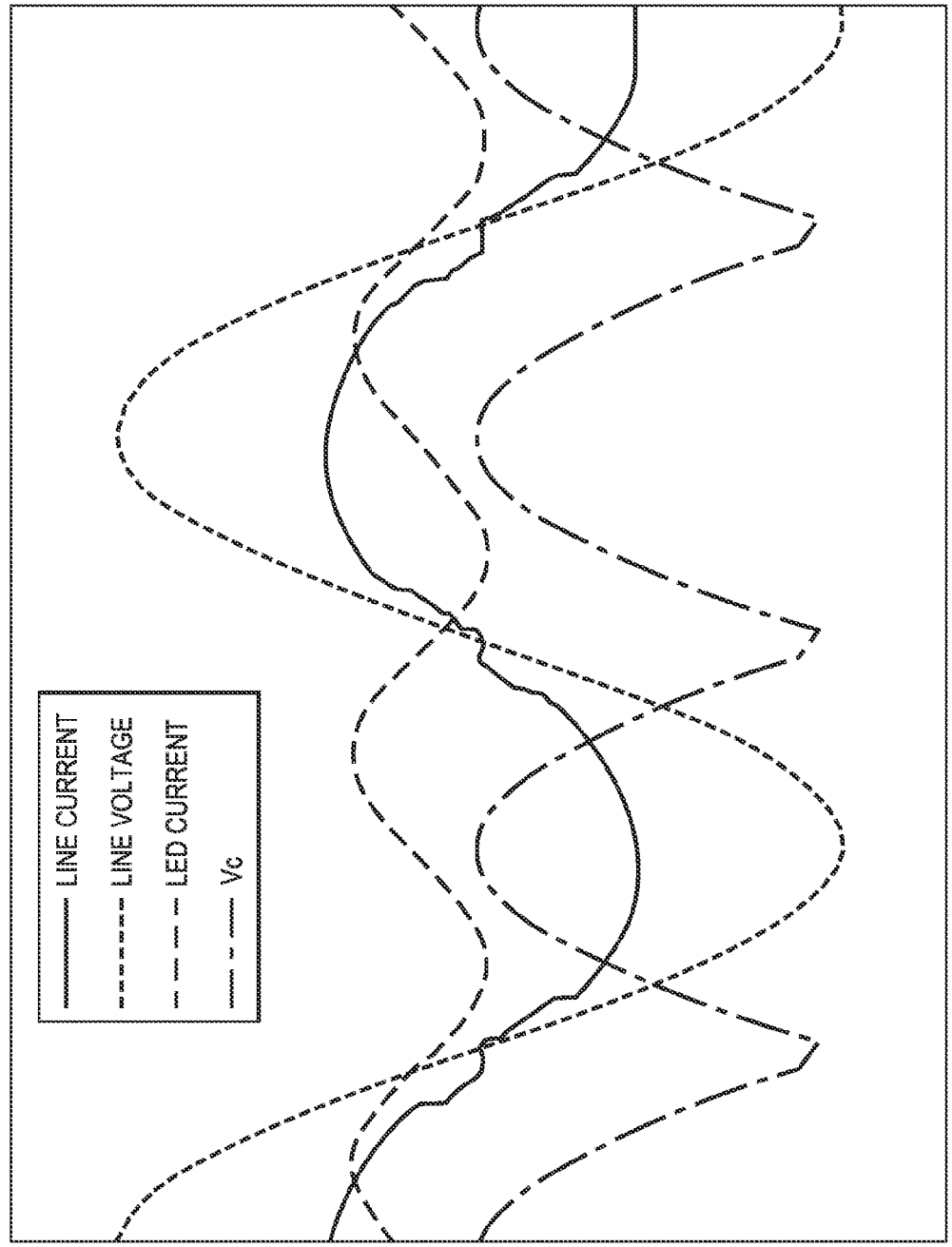
Figure 9C:
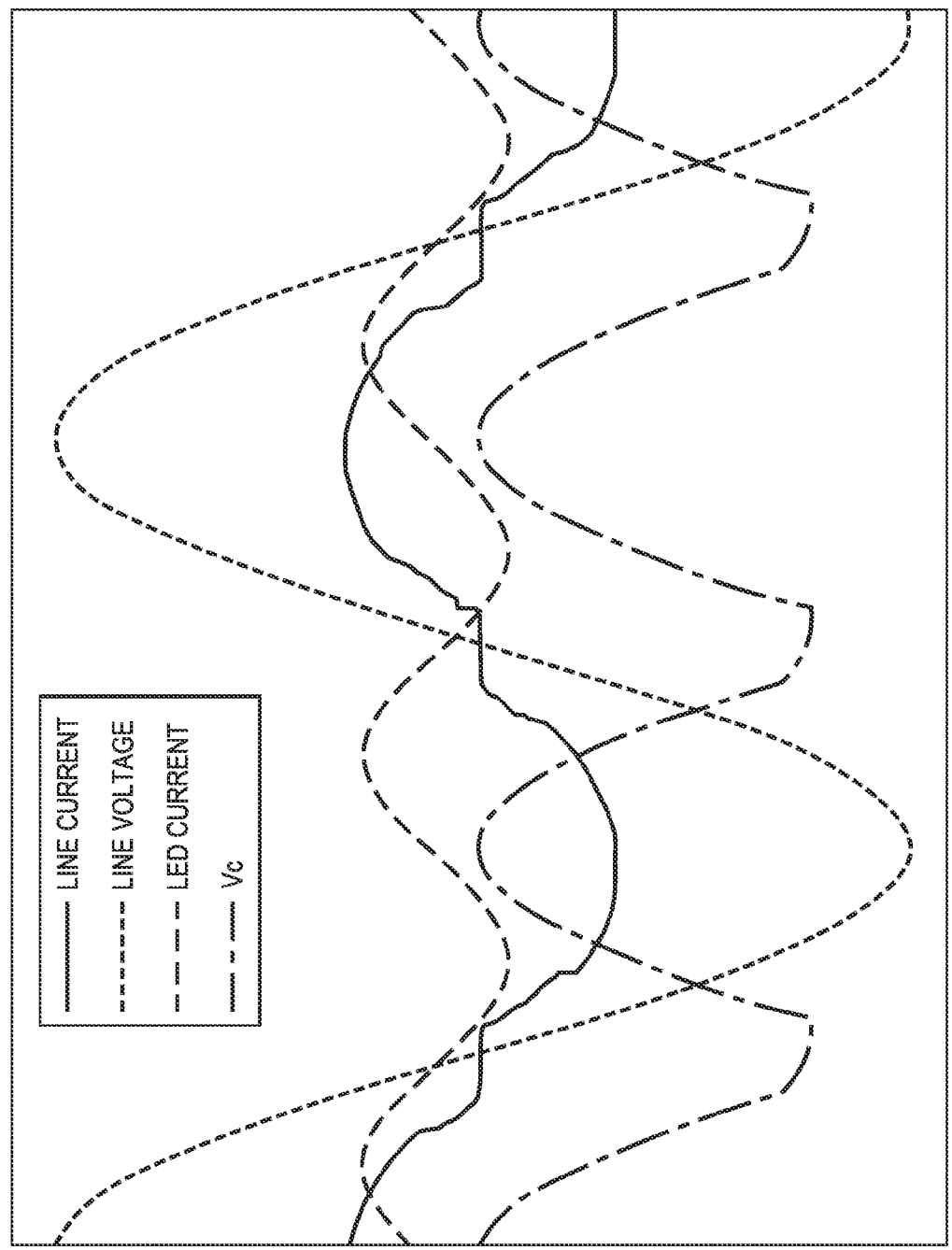

FIGS. 9A-9C illustrate operational waveforms over a range of AC Mains voltage levels. Specifically, FIG. 9A illustrates operation at an AC Mains voltage of 90V, FIG. 9B illustrates operation at an AC Mains voltage of 110V (i.e., the nominal line condition), and FIG. 9C illustrates operation at an AC Mains voltage of 130V. It will be noted that the line current tracks the input voltage and compares favorably in shape to a sinusoid, especially when considering the nominal line condition shown in FIG. 9B (see, also FIG. 6).

Reference is now made to FIG. 10 which shows a graph of power factor versus line voltage for the light 10'. It will be noted that power factor is near 100% over a line voltage range extending from 90V to 130V.

Figure 11:
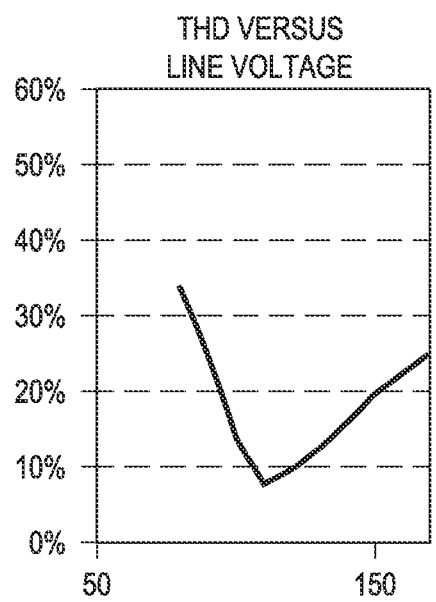
FIG. 11 is a graph of total harmonic distortion versus line voltage.

Reference is now made to FIG. 11 which shows a graph of total harmonic distortion versus line voltage for the light 10'. It will be noted that the total harmonic distortion is minimized at about the nominal line voltage (in this case at about 110V). It is preferred to keep total harmonic distortion below 20% and thus FIG. 11 shows an acceptable operation over the entire line voltage range extending from 90V to 130V.

Figure 12:
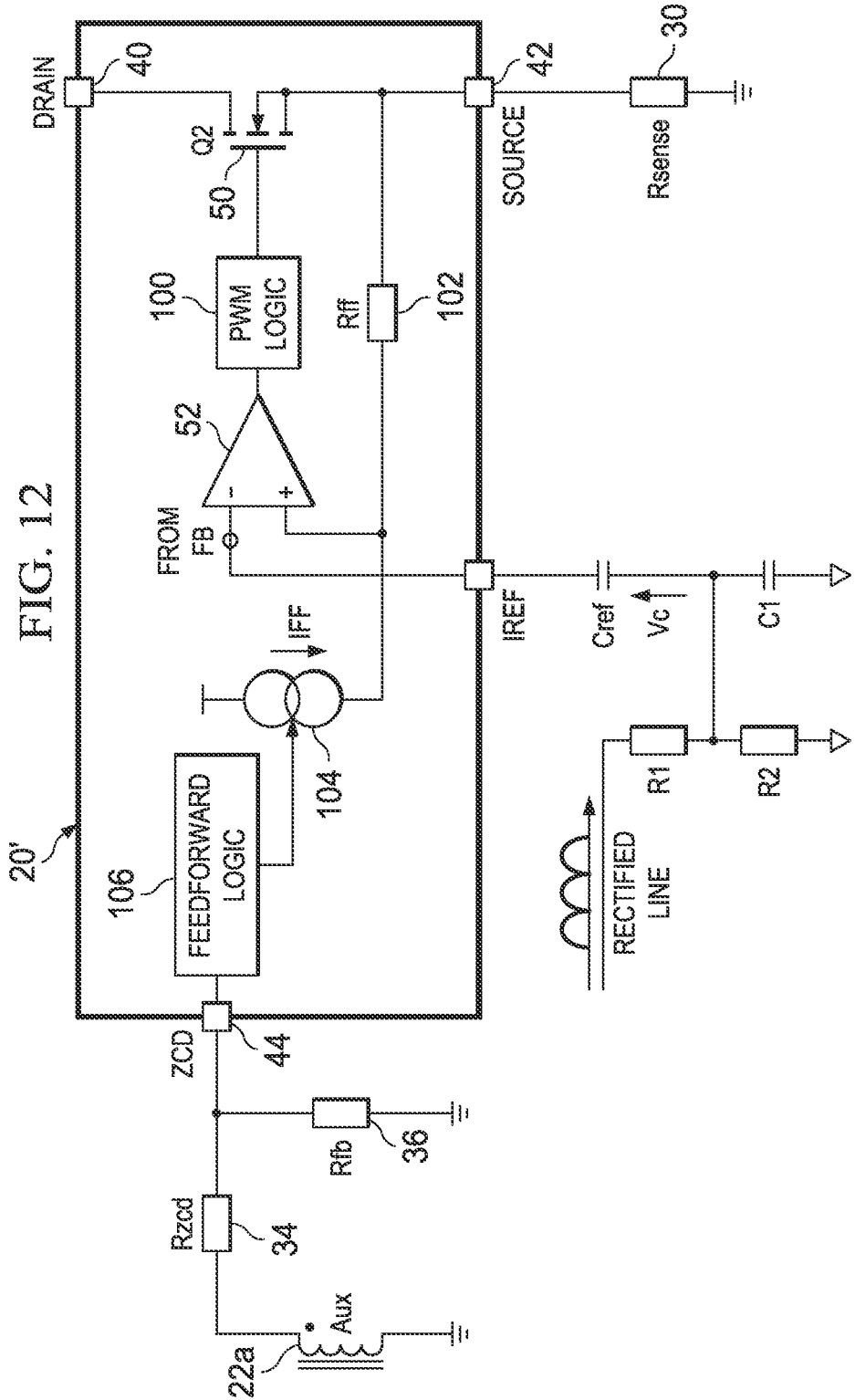
FIG. 12 illustrates an alternative configuration of the driver circuit.

Reference is now made to FIG. 12 which illustrates an alternative configuration of the driver circuit 20'. Again, like reference numbers refer to like or similar parts and no further description will be provided for such parts. The circuitry in FIG. 12 differs from that of FIG. 5 in the use of a PWM logic circuit 100 to drive the gate of the power MOSFET 50. Such PWM control circuits are well known to those skilled in the art (and may be used in the circuit of FIGS. 1 and 5). An input of the PWM logic circuit 100 is coupled to the output of the comparator 52 configured as a current comparator circuit. A positive input terminal of the comparator 52 is coupled to the source of the MOSFET 50 through a feedback resistor 102 (which may be used as well in the circuit of FIGS. 1 and 5). The negative input terminal of the comparator 52 is connected to receive a reference voltage generated using the feedback circuitry with power factor correction as illustrated in FIG. 5. The positive input terminal of the comparator 52 is further configured to receive a feed forward current supplied by a variable current source 104. A feed forward logic circuit 106 has an input connected to the demagnetization sensing terminal 44. An output of the feed forward logic circuit 106 controls the selection of the current output from the variable current source 104.

From Equation 6 it is noted that in an ideal case the output current is not affected by other parameters, such as input voltage. In actuality, non-idealities in the circuit will affect the accuracy of the output current regulation. The propagation delay from the current comparator will produce an actual output current that is larger than calculated value. Also, this is input voltage dependent. The higher input voltage, the greater the error. The circuitry of FIG. 12 provides input voltage feed forward compensation designed to make the output current independent of input voltage.

If the time for the propagation delay is Td, the current overshoot will be:

$$\Delta Ip = Vin*Td/Lp \qquad \text{Equation 9}$$

Where Lp is the primary inductance.

During MOSFET 50 "ON" time, the auxiliary winding 22a will sense the input voltage. The feed forward logic circuit 106 receives the sensed input voltage through the demagnetization sensing terminal 44 and causes the variable current source 104 to generate the feed forward current for application to the positive input terminal of the comparator 52 in order to compensate for the current overshoot caused by the propagation delay. The feed forward current is proportional to input voltage:

$$I_{FF} = \frac{Vin}{N_{P-AUX} * R_{ZCD}} \qquad \text{Equation 10}$$

Where $N_{P-AUX}$ is the turns ratio of the auxiliary winding 22a.

To compensate the offset current caused by delay, then:

$$\frac{Vin*Td}{Lp} * Rsense = \frac{Vin*Rff}{N_{P-AUX} * R_{ZCD}} \qquad \text{Equation 11}$$

Where Rff is an internal compensation resistor. From Equation 11, the resistance Rzcd (resistor 34) can be selected:

$$R_{ZCD} = \frac{Rff * Lp}{N_{P-AUX} * Rsense * Td} \qquad \text{Equation 12}$$

It is understood by those skilled in the art that no transformer 22 is perfect. In Equation 6, the turns ratio n for the transformer is considered. The actual effective turns ratio neff, however, will be lower than the value n because of the known non-ideal coupling effect. The leakage inductance will delay the power transferring and induces extra loss in the process.

The primary inductance Lp has two parts, the magnetizing inductance Lm and the leakage inductance Llk. If the coupling co-efficiency is k, then:

$$Lm = k*Lp \qquad \text{Equation 13}$$

and $$Llk = (1-k)*Lp \qquad \text{Equation 14}$$

When the power MOSFET 50 is turned on, the primary inductor 22p will be charged to Ip. When the power MOSFET 50 is turned off, the primary/secondary energy transfer will not take place immediately. There exists a delay time (Δt) determined by the leakage inductance and clamping voltage, where:

$$\Delta t = \frac{Llk}{Vs - n*Vout} * Ip \qquad \text{Equation 15}$$

and $$\frac{Is}{n} = \left(\frac{Vs - n*Vout}{Llk} - \frac{n*Vout}{Lm}\right)*\Delta t \qquad \text{Equation 16}$$

Where Vs is the clamping voltage on the primary side. The effective turns ratio $n_{eff}$ is thus:

$$n_{eff} = n*\left(1 - \frac{Llk}{Lm} * \frac{n*Vou}{Vs - n*Vout}\right) \qquad \text{Equation 17}$$

After the secondary current reaches zero, the auxiliary winding 22a cannot immediately detect that current. It takes about one quarter of the resonant period for the voltage to ring down to zero so that a detection can be made. If the demagnetizing time is $t_{demg}$, then the output current is:

$$Iout = \frac{n}{2} * \frac{R*Iref}{Rsense}\left(1 - \frac{t_{demg}}{Tonsec}\right) \qquad \text{Equation 18}$$

This parasitic effect induces a dependence of the output current versus the output voltage because of the variation of Tonsec. Considering all the parasitic effects of the non-ideal circuit, the reduction of output current from theoretical value can reach up to 15%. However, this will be fairly consistent and the off-chip resistor values can be adjusted to obtain a desired output current.

Figure 13:
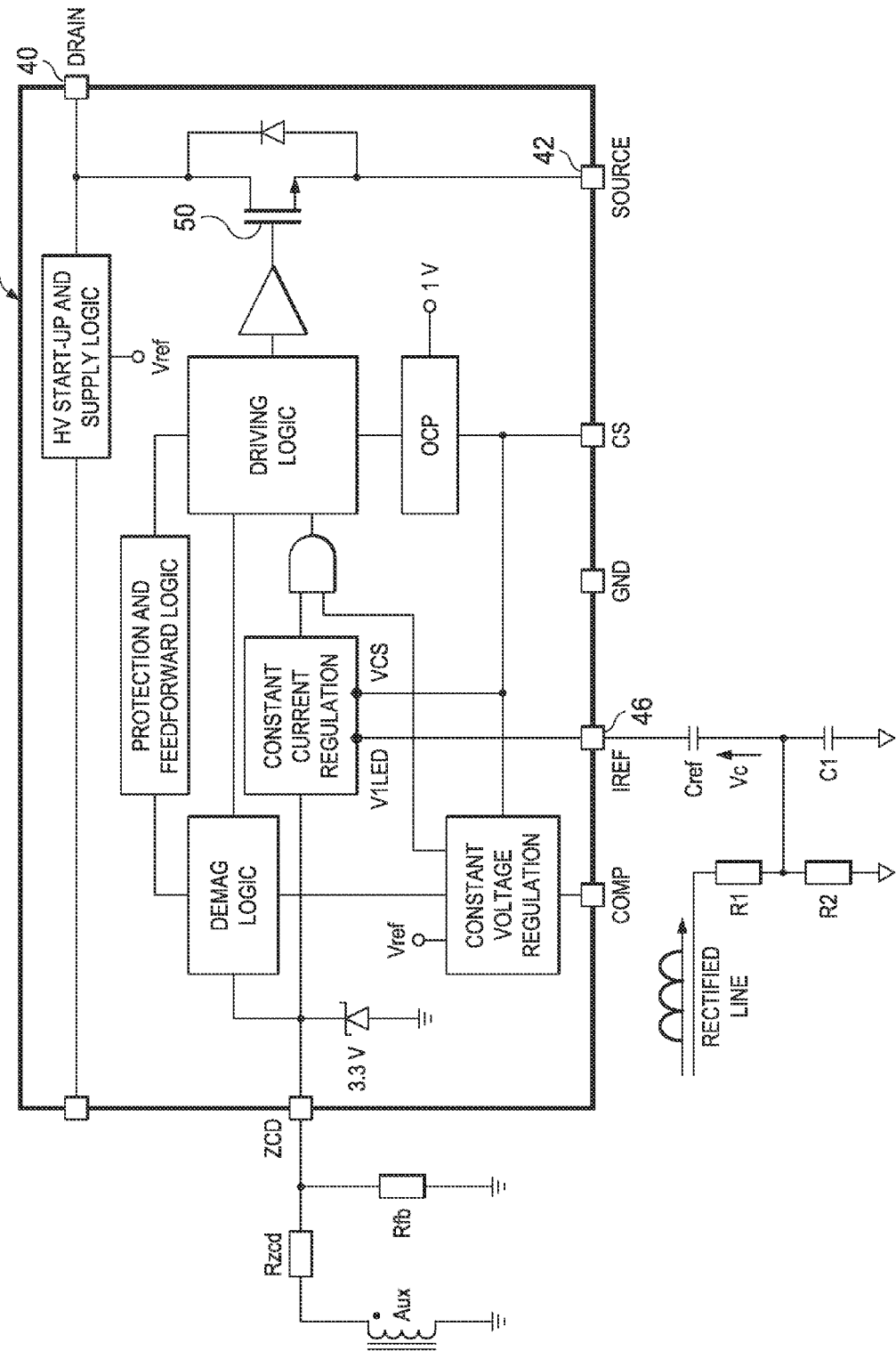
FIG. 13 illustrates an alternative configuration of the driver circuit.

Reference is now made to FIG. 13 which illustrates an alternative configuration of the driver circuit 20". In this embodiment, the driver circuit comprises an offline LED driver circuit of the HVLED815 family of circuits supplied by STMicroelectronics. It will accordingly be understood that injection circuit configuration shown in FIG. 5 is applicable in any of a number of driver circuit 20 configurations to inject an AC signal derived from a rectified DC (which itself was derived from AC power supply signal) into the reference comparison terminal of the driver circuit (i.e., the current reference terminal 46). The voltage at that terminal concerns, for example, the constant current regulation loop reference voltage. The voltage is used as a reference for the power MOSFET's peak drain current during constant current regulation. Injecting the AC signal to modulate the constant current regulation loop reference voltage provides improved performance as described above.

Although the illustrated load comprises LEDs in a lighting application, it will be understood that the circuits and methods described herein are equally applicable to other loads. The reference to an LED load is merely exemplary of a preferred implementation.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit, comprising:
   a transformer including a primary winding having a first terminal configured to receive a rectified DC signal derived from an AC signal, and having a second terminal;
   a comparison circuit having a first input, a second input and an output;
   a power transistor having a first conduction terminal coupled to the second terminal of the primary winding, and having a second conduction terminal coupled to the first input of the comparison circuit, and further having a control terminal coupled to the output of the comparison circuit;
   a first capacitor having a first terminal coupled to the second input of the comparison circuit and having a second terminal;
   a second capacitor having a first terminal coupled to the second terminal of the first capacitor and having a second terminal coupled to a reference supply node; and
   an injection circuit configured to apply an AC signal derived from the rectified DC signal directly to the second terminal of the first capacitor.

2. The circuit of claim 1, further comprising a PWM logic circuit coupled between the output of the comparison circuit and the control terminal of the power transistor.

3. The circuit of claim 1, further comprising:
   a current sourcing circuit coupled to the second input of the comparison circuit; and
   a current sinking circuit coupled to the second input of the comparison circuit.

4. The circuit of claim 3, further comprising a control circuit configured to selectively actuate the current sinking circuit.

5. The circuit of claim 4, wherein the transformer further comprises a secondary winding and wherein the circuit further comprises a sensing circuit configured to sense current delivered by the secondary winding to a load.

6. The circuit of claim 5, wherein the sensing circuit comprises an auxiliary winding on the transformer.

7. The circuit of claim 5, wherein the control circuit responds to sensing circuit sensing of current delivery by the secondary winding to the load by actuating the current sinking circuit.

8. The circuit of claim 7, wherein the control circuit responds to sensing circuit failure to sense current delivery by the secondary winding to the load by deactivating the current sinking circuit.

9. The circuit of claim 1, further comprising a feedback resistor coupled between the second conduction terminal of the power transistor and the first input of the comparison circuit.

10. The circuit of claim 1, wherein the comparison circuit comprises a comparator.

11. A circuit, comprising:
    a first winding coupled to receive a rectified DC signal derived from an AC signal;
    a current sensing resistor coupled in series with the first winding and configured to generate a first signal indicative of sensed current in the first winding;
    a comparison circuit configured to compare the first signal to a second signal presenting a variable reference value;
    a first capacitor configured to store the variable reference value, the first capacitor having a first terminal coupled to the comparison circuit and having a second terminal;
    a second capacitor having a first terminal coupled to the second terminal of the first capacitor and having a second terminal coupled to a reference supply node; and
    an injection circuit configured to apply an AC signal derived from the rectified DC signal directly to the second terminal of the first capacitor storing the variable reference value.

12. The circuit of claim 11, further comprising a switching circuit coupled in series with the first winding and current sensing resistor, wherein activation of the switching circuit is controlled in response to a signal output from the comparison circuit.

13. The circuit of claim 11, further comprising:
    a current sourcing circuit coupled to the first terminal of the first capacitor; and
    a current sinking circuit coupled to the first terminal of the first capacitor.

14. The circuit of claim 13, further comprising a control circuit configured to selectively actuate the current sinking circuit.

15. The circuit of claim 14, further comprising a second winding magnetically coupled to the first winding and wherein the circuit further comprises a sensing circuit configured to sense current delivered by the second winding to a load.

16. The circuit of claim 15, wherein the sensing circuit comprises a third winding magnetically coupled to the first winding.

17. The circuit of claim 15, wherein the control circuit responds to sensing circuit sensing of current delivery by the second winding to the load by actuating the current sinking circuit.

18. A circuit, comprising:
    a first winding coupled to receive a rectified DC signal derived from an AC signal;
    a current sensing resistor coupled in series with the first winding and configured to generate a first signal indicative of sensed current in the first winding;
    a comparison circuit having a first input configured to receive the first signal and having a second input;
    a first capacitor having a first terminal coupled to second input and a second terminal coupled to a first node;
    a second capacitor having a first terminal coupled to the first node and a second terminal coupled to a reference supply node;
    a resistive divider coupled between the rectified DC signal and the reference supply node, the resistive divider having a second node configured to generate an AC signal derived from the rectified DC signal that is applied to the first node.

19. The circuit of claim 18, further comprising a switching circuit coupled in series with the first winding and current sensing resistor, wherein activation of the switching circuit is controlled in response to a signal output from the comparison circuit.

20. The circuit of claim 18, further comprising:
   a current sourcing circuit coupled to the first terminal of the capacitor; and
   a current sinking circuit coupled to the first terminal of the capacitor.

21. The circuit of claim 20, further comprising a control circuit configured to selectively actuate the current sinking circuit.

22. The circuit of claim 21, further comprising a second winding magnetically coupled to the first winding and wherein the circuit further comprises a sensing circuit configured to sense current delivered by the second winding to a load.

23. The circuit of claim 22, wherein the control circuit responds to sensing circuit sensing of current delivery by the second winding to the load by actuating the current sinking circuit.

* * * * *